United States Patent [19]
Durant et al.

[11] Patent Number: 6,016,212
[45] Date of Patent: Jan. 18, 2000

[54] OPTICAL RECEIVER AND DEMULTIPLEXER FOR FREE-SPACE WAVELENGTH DIVISION MULTIPLEXING COMMUNICATIONS SYSTEMS

[75] Inventors: Gregory M. Durant, Plainfield; Christopher L. Rutledge, Somerset, both of N.J.

[73] Assignee: AT&T Corp, New York, N.Y.

[21] Appl. No.: 08/848,370

[22] Filed: Apr. 30, 1997

[51] Int. Cl.$^7$ ........................................... H04J 14/02
[52] U.S. Cl. .................. 359/124; 359/127; 359/130; 359/128; 359/129; 359/159; 385/43
[58] Field of Search ............................ 359/124, 127, 359/128, 130, 129, 159, 172; 385/43

[56] References Cited

U.S. PATENT DOCUMENTS

| | | | |
|---|---|---|---|
| 3,897,135 | 7/1975 | Dyott | 385/43 |
| 4,677,618 | 6/1987 | Haas et al. | 359/124 |
| 4,708,425 | 11/1987 | Gouali et al. | 359/129 |
| 4,773,063 | 9/1988 | Hunsperger et al. | 359/130 |
| 4,807,227 | 2/1989 | Fujiwara et al. | 359/128 |
| 5,214,494 | 5/1993 | Inaba et al. | 359/590 |
| 5,488,500 | 1/1996 | Glance | 359/127 |
| 5,684,614 | 11/1997 | Degura | 359/159 |

*Primary Examiner*—Jeffery A. Hofsass
*Assistant Examiner*—John Tweel, Jr.

[57] ABSTRACT

A free-space wavelength division multiplexing system is provided having a demultiplexer and receiver arrangement. The demultiplexer and receiver arrangement may be based on a rotatable interference filter. A desired wavelength can be selected by adjusting the angle of the interference filter with respect to the incoming light beam. Alternatively, the demultiplexer and receiver arrangement may be based on a diffraction grating. Multiple wavelengths of light are diffracted at different angles, which spatially separates each wavelength in the system. A corresponding multiple-element linear photodetector array is used to receive the spatially separated optical signals.

19 Claims, 3 Drawing Sheets

OPTICAL RECEIVER AND DEMULTIPLEXER FOR FREE-SPACE WAVELENGTH DIVISION MULTIPLEXING COMMUNICATIONS SYSTEMS

FIELD OF THE INVENTION

This invention relates to optical communications, and more particularly, to demultiplexers and receivers for use in free-space wavelength division multiplexing optical telecommunications systems.

BACKGROUND OF THE INVENTION

Free-space optical communications systems are systems in which beams of modulated light are transmitted from transmitters to receivers through free space (air). Such systems can be used to provide telecommunications services in areas in which it is difficult or expensive to provide hard-wired network connections using twisted pair wiring, coaxial cable, or optical fiber. It may be desired to use wavelength division multiplexing in a free-space optical communications system to increase the information carrying capacity of the system. By using multiple wavelengths of light in such systems, wavelength division multiplexing allows multiple channels of information to be carried between transmitters and receivers. At the receivers, the multiple channels are demultiplexed by wavelength filtering.

In wavelength division multiplexing systems in which optical signals are transmitted between network nodes solely on single mode optical fiber, a single mode fiber-based demultiplexer may be used to perform wavelength filtering. However, fiber-based demultiplexers can be difficult to use. For example, it is extremely difficult to couple free space transmissions into single mode fiber-based demultiplexers.

It is therefore an object of the present invention to provide improved demultiplexers and receivers for use in free-space wavelength division multiplexing optical communications systems.

SUMMARY OF THE INVENTION

This and other objects of the invention are accomplished in accordance with the principles of the present invention by providing a free-space wavelength division multiplexing system having a demultiplexer and receiver arrangement. Various wavelengths of light are multiplexed at a source node and transmitted to a user premises node through free space. Telephone service, video service, and integrated services digital network (ISDN) service are examples of the types of service that may be provided with the system. If desired, each type of service may be provided on a separate wavelength channel.

The demultiplexer and receiver arrangement separates the multiplexed wavelengths so that the user can receive data for one or more of the desired services. The demultiplexer and receiver arrangement may be based on a rotatable interference filter. A desired wavelength can be selected by adjusting the angle of the interference filter with respect to the incoming multiplexed light beam. Alternatively, the demultiplexer and receiver arrangement may be based on a diffraction grating. Multiple wavelengths of light are diffracted at different angles by the diffraction grating. Each such spatially separated beam of light may be directed onto a corresponding detector element in a multiple-element linear photodetector array. The data on each channel is therefore available by electrically accessing the appropriate detector element.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
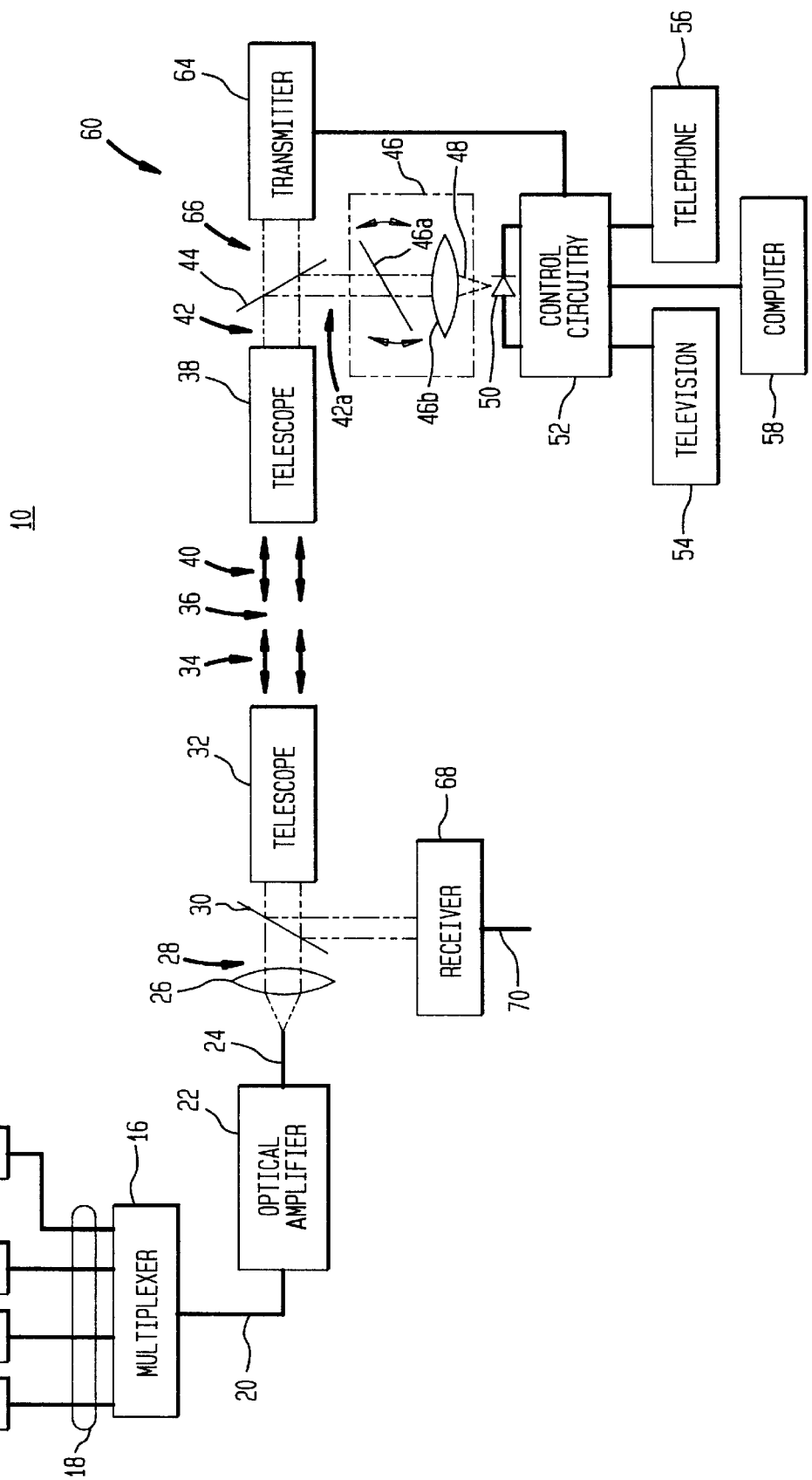
FIG. 1 is a schematic diagram of a system in accordance with the present invention.

A portion of an illustrative free-space wavelength division multiplexing communications system 10 is shown in FIG. 1. In general, free-space communications systems have multiple nodes for transmitting and receiving data. In the portion of the illustrative system 10 shown in FIG. 1, data is transmitted between source node 62 and user premises node 60, but it will be appreciated that similar transmissions also occur between other system nodes (not shown).

Data for various services, such as plain old telephone service (POTS), video service, integrated digital services network (ISDN) service, satellite-originated television service, etc., is provided at data inputs 12 of light sources 14. The information provided to data inputs 12 may be provided from a free-space receiver (not shown) connected to source 62 or from a connection to the existing (non-free-space) telecommunications network infrastructure (not shown).

Light sources 14 may be any suitable narrow-bandwidth source of light for free-space optical wavelength division multiplexing. For example, light sources 14 may be distributed feedback (DFB) lasers operating in the 1550 nm wavelength range. Operating in the 1550 nm wavelength region is desirable, because water absorption in air is relatively low in this region. Distributed feedback lasers are desirable because they are readily available and have narrow line widths (on the order of an angstrom). There may be 16–32 light sources 14 each of which has an operating wavelength separated by 2 nm from its adjacent channel (i.e., $\lambda_1$=1530 nm, $\lambda_2$=1532 nm, etc.).

The modulated optical outputs of light sources 14 are multiplexed together for free-space transmission to premises 60, where the signals for the different channels are demultiplexed. It is not necessary that a single service (i.e., POTS, video, ISDN, etc.) be associated with each light source 14, but such an arrangement may be advantageous for certain system architectures.

One suitable multiplexer arrangement involves coupling the outputs of light sources 14 to multiplexer 16 by optical fibers 18. The wavelength multiplexed output of multiplexer 16 may then be provided on fiber A wide-band optical amplifier 22, such as an $Er^{3+}$-doped fiber amplifier, may be provided to boost the optical signal power of the signals on fiber 20. (A similar amplifier may also be used in the receiver end of system 10, if desired.) The amplified output of optical amplifier 22 may be provided on fiber 24. If fiber 24 is a single mode fiber, the light beam exiting optical fiber 24 will diverge with a standard 150 angle of divergence until collimated by lens 26. Collimated light beam 28 passes through beam splitter 28 and is coupled into telescope 32, which further conditions the transmitted beam. Upon exiting telescope 32, beam 34 passes through free space (air) 36, which is preferably in the range of about ten to a thousand meters in length. At the entrance to telescope 38, beam 40 typically has a diameter of several inches. Telescope 38 collimates beam 40 and reduces its size so that beam 42 has a diameter of approximately half an inch as it leaves telescope 38.

Beam splitter 44 directs multiplexed beam 42a into demultiplexer 46. Various demultiplexer arrangements may be used in system 10. The illustrative demultiplexer 46 shown in FIG. 1 has rotatable interference filter 46a and lens 46b (which may be one or more physical lenses). A single wavelength may be extracted from the multiple wavelengths of light in beam 42a by interference filter 46a. This single wavelength, which contains data for a single channel selected from among the multiple channels of data multiplexed onto fiber 20, is focused onto photodetector 50 by lens 48. Signals from photodetector 50 are processed by control circuitry 52, which may provide video signals to television 54, telephone signals to telephone 56, and ISDN signals to computer 58.

Television 54, telephone 56, and computer 58 are located in premises 60, which is typically a user's home or office. Signals from premises 60 may often need to be transmitted back to source node 62. For example, two-way telephone conversations using telephone 56 require that voice data be transmitted from premises 60 to source 62. Similarly, computer 58 supports two-way traffic and services such as pay-per-view ordering may require signals from television 54 to be transmitted to source 60. Signals to be transmitted from customer equipment such as television 54, telephone 56, and computer 58, are provided to transmitter 64 by control circuitry 52.

Output beam 66 from optical transmitter 64, which may contain either a single wavelength or multiple wavelengths of light, may be transmitted to source node 60 (as illustrated in FIG. 1) or may be transmitted to another appropriate network node in free-space optical communications system 10. Output beam 66 is transmitted through beam splitter 44, telescope 38, and free space 36. At source 60, this optical signal is received by telescope 32 and deflected toward receiver 68 by beam splitter 30. If the optical signal received at receiver 68 contains multiple wavelengths of light, receiver 68 may be provided with optical wavelength demultiplexing capabilities. Receiver 68 converts optical signals into electrical signals that may be provided to an appropriate portion of system 10 or the existing network infrastructure via output 70.

Figure 2A:
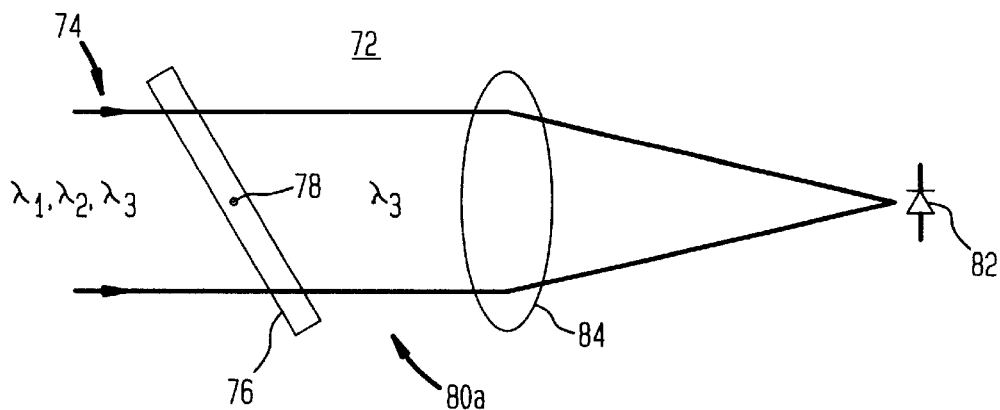
FIGS. 2a and 2b are views of a tunable interference filter demultiplexer and receiver arrangement in accordance with the present invention.
Figure 2B:
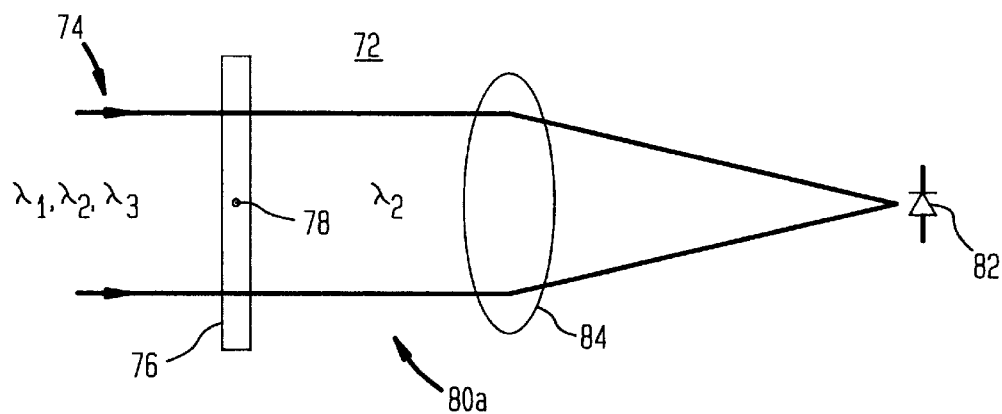

A demultiplexer and receiver arrangement 72 based on a tunable interference filter is shown in FIGS. 2a and 2b. Light beam 74 contains multiple wavelengths of light (illustrated as $\lambda_1, \lambda_2$, and $\lambda_3$ in FIG. 2), each corresponding to a separate channel. Interference filter 76 is rotated about axis 78 (which is perpendicular to the page) to select a desired wavelength. Interference filter 76 is preferably a multiple dielectric stack filter such as those available from JDS-Fitel Inc. or Gould Optics. When interference filter is positioned at the angle shown in FIG. 2a, the single wavelength $\lambda_3$ is transmitted. Beam 80a (which contains only light at wavelength $\lambda_3$ in the arrangement of FIG. 2a) is focused onto photodetector 82 by lens 84. When interference filter is positioned at the angle shown in FIG. 2b, the single wavelength $\lambda_2$ is transmitted. Beam 80b (which contains only light at wavelength $\lambda_2$ in the arrangement of FIG. 2b) is focused onto photodetector 82 by lens 84.

Figure 3:
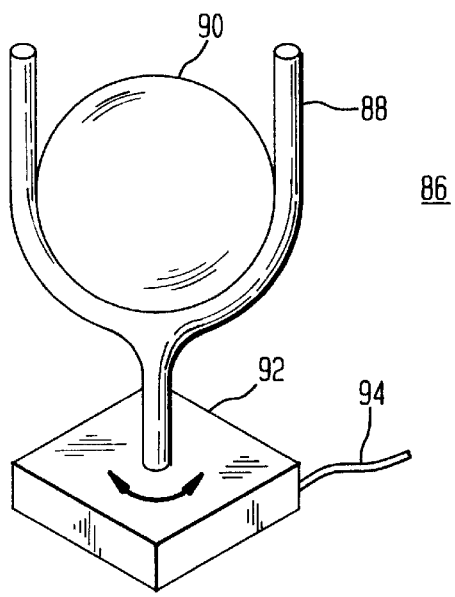
FIG. 3 is a perspective view of an illustrative mounting apparatus for the tunable interference filter demultiplexer of FIGS. 2a and 2b.

Interference filter 76 of FIG. 2 may be positioned using the illustrative positioning apparatus 86 shown in FIG. 3. Apparatus 86 has yoke 88 in which interference filter 90 is mounted. Motor 92 (e.g., a stepper motor) controls the rotational position of interference filter 90 in response to control commands received via input 94 from control circuitry such as control circuitry 52 of FIG. 1.

If desired, apparatus 86 may dither the rotational position of interference filter 90 while monitoring the transmitted optical signal strength to ensure that the transmitted signal is maximized and to ensure that the system remains locked on the desired wavelength when a particular channel has been selected.

In addition, information (such as a channel number) may be encoded into each channel that uniquely identifies that channel. For example, if a digital modulation scheme is used, a channel number (e.g., No. 1–32) may be inserted into transmitted data for a channel once every 256 bits. If an analog modulation scheme is used, an analog identifier may be inserted into the transmitted data for a channel.

Figure 4:
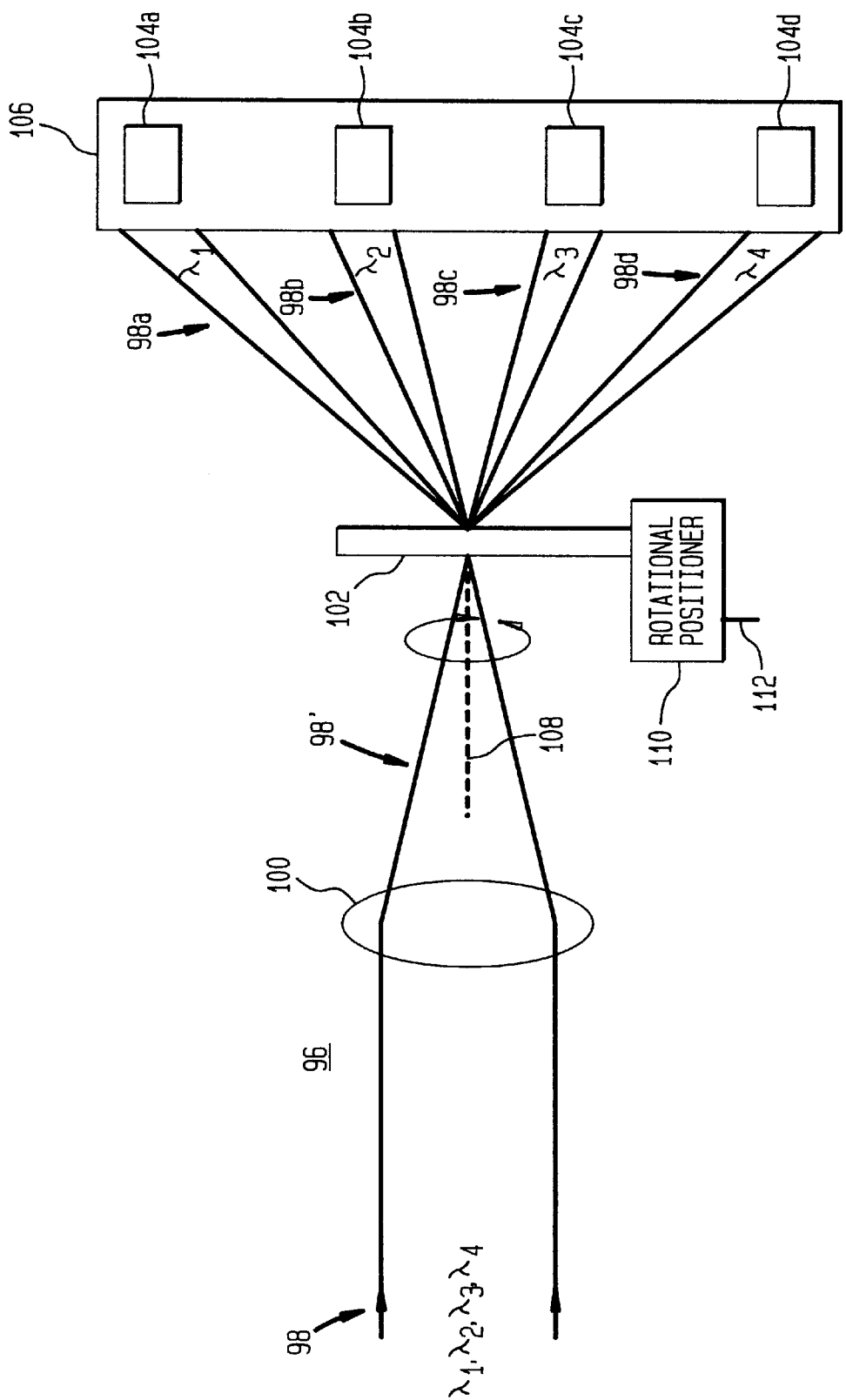
FIG. 4 is a partially schematic diagram of a diffraction grating demultiplexer in accordance with the present invention.

Another demultiplexer and receiver arrangement in accordance with the present invention is shown in FIG. 4. In illustrative demultiplexer and receiver arrangement 96, beam 98 contains wavelengths $\lambda_1, \lambda_2, \lambda_3$, and $\lambda_4$, each of which corresponds to a separate data channel. If desired, beam 98 may be focused by lens 100 or otherwise conditioned by appropriate optics. Diffraction grating 102 divides conditioned beam 98' into beams 98a, 98b, 98c, and 98d, each of which contains a single wavelength of light. Diffraction grating 102 may be any suitable diffraction grating capable of spatially separating the different wavelength channels, such as gratings available from Richardson Grating Laboratory/Spectronic Instruments Inc. of Rochester, N.Y. Grating 102 may be transmissive (as shown in FIG. 4) or may be reflective.

Rotational positioner 110, which receives control signals via input 112 from control circuitry such as control circuitry 52 of FIG. 1, controls the rotational orientation of diffraction grating 102 about longitudinal axis 108 to ensure that beams 98a, 98b, 98c, and 98d are aligned with respective detector elements 104a, 104b, 104c, and 104d of multiple-element detector 106. The rotational position of diffraction grating 102 can be adjusted during an initial alignment step or while optical signals are being received by detector 106 to ensure proper alignment between diffraction grating 102 and detector 106. Aligning diffraction grating 102 and detector 106 during signal detection ensures that alignment is maintained between beams 98a, 98b, 98c, and 98d and detector elements 104a, 104b, 104c, and 104d, which ensures that the signals for each channel are properly received.

Beam 98a contains light of wavelength $\lambda_1$, beam 98b contains light of wavelength $\lambda_2$, beam 98c contains light of wavelength $\lambda_3$, and beam 98d contains light of wavelength $\lambda_4$. It will be understood that the light source 14 (FIG. 1) for each channel has a finite non-zero line width about its nominal wavelength and that the demultiplexing operations of the present invention transmit light in a non-zero bandwidth about certain center wavelengths. Nevertheless, to make the description of the present invention easier to follow, each light source is referred to as producing light at a single wavelength. Similarly, the demultiplexer arrangements are referred to as transmitting single wavelengths of light for each channel.

Detector 106 is preferably sensitive in the wavelength region centered around 1550 nm (e.g., approximately 1530–1560 nm), so that the wavelengths of light transmitted by sources 14 (FIG. 1) can be detected. Detector 106 may be a device similar to the InGaAs linear photodiode arrays available from Epitaxx Optoelectronic Devices of Trenton, N.J. or the InGaAs/InP linear photodiode arrays available from Eidgenossische Technische Hochschule of Zurich, Switzerland.

Each detector element 104a, 104b, 104c, and 104d receives data for a different channel. If desired, control circuitry such as control circuitry 52 of FIG. 1 can be used to extract a single desired channel from among the multiple channels received by detector 106. Alternatively, data for multiple channels can be processed simultaneously. For example, a user may subscribe to both telephone service (provided using $\lambda_1$) and video service (provided using $\lambda_2$). Telephone data can be received with detector element 104a while video data is simultaneously received with detector element 104b.

The foregoing is merely illustrative of the principles of this invention and various modifications can be made by those skilled in the art without departing from the scope and spirit of the invention.

What is claimed is:

1. A free-space wavelength division multiplexing system having a plurality of channels, each channel being associated with a light source of a different optical wavelength, the system having a first node at which the light sources of different optical wavelengths are multiplexed together into a multiplexed optical signal and a second node at which a user has electrical system components, the system comprising:

free-space transmitter optics at the first node for launching the multiplexed optical signal into free space as a multiplexed optical beam;

free-space receiver optics at the second node for receiving the multiplexed optical beam from free-space;

a rotatable optical interference filter that receives the multiplexed optical beam from the free-space receiver optics and transmits a demultiplexed optical beam that corresponds to a single selected one of the channels and that has a single selected wavelength;

a positioner for controlling the angular position of the interference filter with respect to the multiplexed optical beam to determine which channel is transmitted; and a photodetector for receiving the demultiplexed optical beam and providing corresponding output signals for the selected channel.

2. The system defined in claim 1 further comprising control circuitry that receives the output signals for the selected channel from the photodetector and provides data for an associated service to at least one of the electrical system components.

3. The system defined in claim 1 further comprising a transmitter at the second node for transmitting signals from at least one of the electrical system components to the first node through free space.

4. The system defined in claim 1 said rotatable optical interference filter further comprising a lens for focusing the demultiplexed beam onto the photodetector.

5. The system defined in claim 1 wherein the interference filter comprises a multiple dielectric stack.

6. The system defined in claim 1 wherein the light sources are distributed feedback lasers.

7. A free-space wavelength division multiplexing system having a plurality of channels, each channel being associated with a light source of a different optical wavelength, the system having a first node at which the light sources of different optical wavelengths are multiplexed together into a multiplexed optical signal and a second node at which a user has electrical system components, the system comprising:

free-space transmitter optics at the first node for launching the multiplexed optical signal into free space as a multiplexed optical beam;

free-space receiver optics at the second node for receiving the multiplexed optical beam from free-space;

a diffraction grating that receives the multiplexed optical beam from the free-space receiver optics and provides a plurality of spatially separated demultiplexed optical beams each of which is associated with one of the channels and which has a single wavelength; and a linear detector array having a plurality of detector elements each of which receives a corresponding one of the spatially separated demultiplexed optical beams and which provides corresponding output signals for the associated channel.

8. The system defined in claim 7 further comprising control circuitry that receives the output signals for each channel from the linear detector array and provides data for associated services to the electrical system components of the user.

9. The system defined in claim 7 further comprising a transmitter at the second node for transmitting signals from at least one of the electrical system components to the first node through free space.

10. The system defined in claim 7 further comprising a lens for focusing the multiplexed beam onto the diffraction grating.

11. The system defined in claim 7 wherein the light sources are distributed feedback laser diodes.

12. The system defined in claim 7 further comprising a rotational positioner for adjusting the rotational orientation of the diffraction grating about a longitudinal optical axis of the multiplexed.

13. A free-space wavelength division multiplexing system having a plurality of channels, each channel being associated with a light source of a different optical wavelength, the system having a first node at which the light sources of different optical wavelengths are multiplexed together into a multiplexed optical signal, a second node at which a user has electrical system components, and free-space transmitter optics at the first node for launching the multiplexed optical signal into free space as a multiplexed optical beam, the system comprising:

free-space receiver optics at the second node for receiving the multiplexed optical beam from free-space;

a rotatable optical interference filter that receives the multiplexed optical beam from the free-space receiver optics and transmits a demultiplexed optical beam that corresponds to a single selected one of the channels and that has a single selected wavelength;

a positioner for controlling the angular position of the interference filter with respect to the multiplexed optical beam to determine which channel is transmitted; and a photodetector for receiving the demultiplexed optical beam and providing corresponding output signals for the selected channel.

14. The system defined in claim 1 wherein said free space is at least ten meters in length.

15. The system defined in claim 1 wherein said free-space transmitter optics comprises a telescope.

16. The system defined in claim 1 wherein said free-space receiver optics comprises a telescope for collimating a free-space beam of diameter greater than one inch to a diameter of less than an inch.

17. The system defamed in claim 7 wherein said free space is at least ten meters in length.

18. The system defamed in claim 7 wherein said free-space transmitter optics comprises a telescope.

19. The system defined in claim 7 wherein said free-space receiver optics comprises a telescope for collimating a free-space beam of diameter greater than one inch to a diameter of less than an inch.

* * * * *